United States Patent [19]
Andriash

[11] Patent Number: 6,030,687
[45] Date of Patent: *Feb. 29, 2000

[54] VISION CONTROL PANELS FOR DISPLAYING DISCRETE IMAGES OBSERVABLE FROM ONE SIDE OF THE PANEL AND METHOD OF MAKING

[76] Inventor: Michael D. Andriash, Unit 1-675 Evans Court, Kelowna, British Columbia, Canada, V1X 6G4

[*] Notice: This patent is subject to a terminal disclaimer.

[21] Appl. No.: 09/261,141

[22] Filed: Mar. 3, 1999

Related U.S. Application Data

[60] Division of application No. 08/954,158, Oct. 20, 1997, Pat. No. 5,939,168, which is a continuation-in-part of application No. 08/598,680, Feb. 8, 1996, Pat. No. 5,679,435, which is a continuation-in-part of application No. 08/268,549, Aug. 15, 1994, abandoned, and a continuation-in-part of application No. 08/262,976, Jun. 21, 1994, Pat. No. 5,550,346.

[51] Int. Cl.[7] .................................................. B32B 3/24
[52] U.S. Cl. .......................... 428/138; 428/131; 428/195; 428/201; 428/203; 428/204; 428/918; 428/913; 428/38; 428/212; 428/338; 428/137; 359/839; 359/594; 359/536; 427/243; 219/121.7; 264/400
[58] Field of Search ...................................... 428/138, 131, 428/195, 201, 203, 204, 918, 913, 38, 212, 338, 137; 359/839, 594, 536; 427/243; 219/121.7; 264/400

[56] References Cited

U.S. PATENT DOCUMENTS

| | | | |
|---|---|---|---|
| 4,673,609 | 6/1987 | Hill | 428/187 |
| 4,690,419 | 9/1987 | Hoshal | 280/154.5 R |
| 4,940,622 | 7/1990 | Leavitt, Sr. et al. | 428/137 |
| 5,609,938 | 3/1997 | Shields | 428/138 |
| 5,679,435 | 10/1997 | Andriash | 428/137 |
| 5,773,110 | 6/1998 | Shields | 428/40.1 |
| 5,858,155 | 1/1999 | Hill et al. | 156/230 |
| 5,925,437 | 7/1999 | Nelson | 428/137 |
| 5,939,168 | 8/1999 | Andriash | 428/138 |

*Primary Examiner*—William P. Watkins, III
*Attorney, Agent, or Firm*—Nixon & Vanderhye

[57] ABSTRACT

A retroreflective vision control panel which includes an opaque sheet material coated with retroreflective light reflecting particles and a dark opaque color on the reverse side thereof, and an image formed over top the retroreflective particles using colored light permeable translucent inks or films to form an image thereon. The opaque sheet and image have a plurality of perforations spaced therethrough. Translucent light-permeable sheet material is provided on the back side of the panel and overlaid on one or the other side with translucent inks to form a second image. An observer on the front side of the panel will observe one or the other of the images, depending upon the relative intensity of the light incident on the front and back sides of the panel.

18 Claims, 7 Drawing Sheets

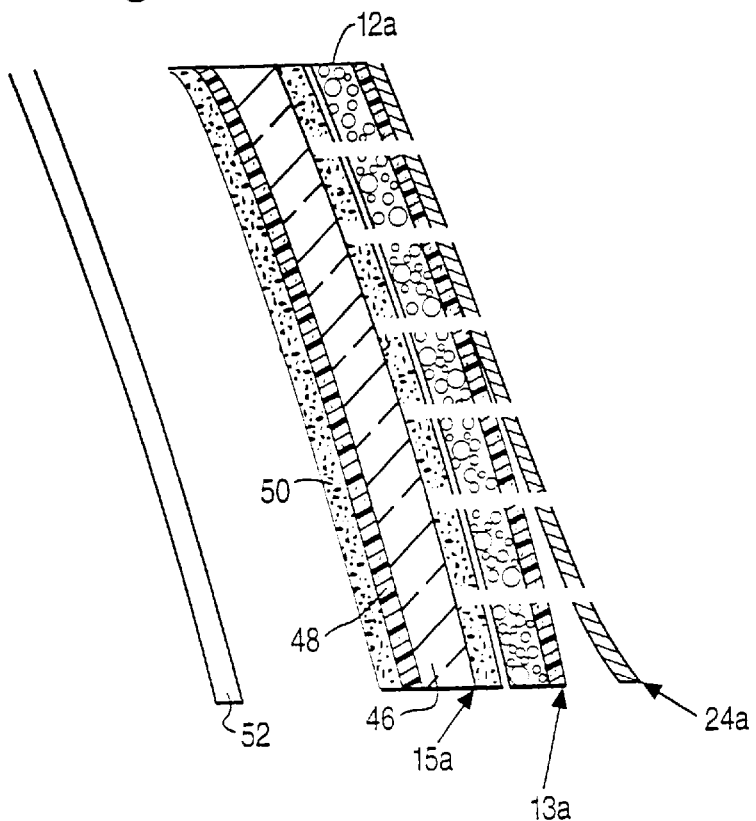
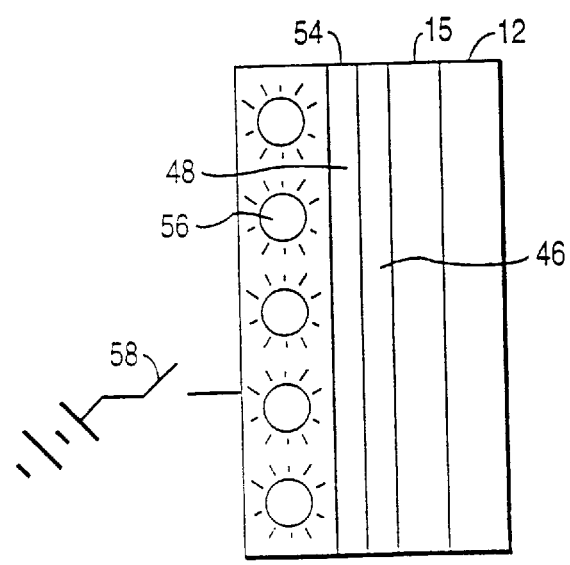

VISION CONTROL PANELS FOR DISPLAYING DISCRETE IMAGES OBSERVABLE FROM ONE SIDE OF THE PANEL AND METHOD OF MAKING

RELATED APPLICATION

This is a divisional of application Ser. No. 08/954,158, filed Oct. 20, 1997, now U.S. Pat. No. 5,939,168, which is a continuation-in-part of application Ser. No. 08/598,680, filed Feb. 8, 1996, now U.S. Pat. No. 5,679,435, issued Oct. 21, 1997, which in turn is a continuation-in-part of application Ser. No. 08/268,549, filed Aug. 15, 1994, now abandoned and a continuation-in-part of application Ser. No. 08/262,976, filed Jun. 21, 1994, now U.S. Pat. No. 5,550,346, issued Aug. 29, 1996.

BACKGROUND AND SUMMARY OF THE INVENTION

The present invention relates to a method of forming light permeable panels so that a viewer on one side of the panel can observe two different or discrete images on the panel dependent upon the intensity of light incident on opposite sides of the panel and particularly to a perforated panel having retroreflective material.

According to my invention as disclosed in my U.S. Pat. No. 5,679,435, there is provided a vision control panel made up of an retroreflective opaque sheet material with a dark color on the reverse side and an image formed on one surface of the opaque sheet. The opaque sheet and retroreflective image have a plurality of perforations formed by a laser, the perforations being spaced thereover such that when the light level on the image side of the panel is slightly less than, equal to, or greater than that on the other side, an observer on the image side sees only the image while an observer on the other side sees through the panel without seeing the image. By laser perforating, the entire image or design, one avoids blocking vision through the design from the side opposite the image side. Moreover, in fabricating the panel there is no need to align inks forming the design as would be the case in prior methods using ink dots on a light permeable, transparent, non opaque sheet.

The retroreflective material comprises an opaque sheet of material, preferably vinyl, using glass beads or metallized particles formed between various substrates of adhesives, colored sheet materials and other laminates. These retroreflective sheet materials may then be over-printed with translucent light permeable inks which allow light to pass therethrough allowing for light reflection of the colored image and design of 100, 200, 300 candle power and more for improved viewing properties under varying light conditions.

Preferably the image is formed by at least two different colors in the form of a design. A transparent sheet containing a U.V. chemical resistor may be used to cover the image on either side of the sheet material to prevent dirt or rain drops from entering the perforations and to protect the pigments of the colors from rapid sun fading. The placement of the transparent sheet on one side as opposed to the other side depends on whether the sheet material is to be attached to the inside or outside of the window or glass. The assembly methods used for attachment of the transparent protective sheet vary depending on visibility requirements. In one method of making a vision control panel, there is no glue or adhesive coating the transparent sheet material therefor there is no possibility for the glue to yellow in the transparent regions of the perforated panel. In another method of making a vision control panel, the transparent protective sheet material has a clear adhesive coating which eliminates the requirement of a transfer adhesive first applied to the retroreflective sheet material prior to perforation.

In another aspect of the invention of my prior patent, there is provided a method of forming a vision control panel which includes forming a combination of pre selected retroreflective light reflecting films overlaid with translucent ink colors or films and an underlying dark colored opaque light absorbing color or film and then laser perforating the combination to form a matrix of spaced apart small apertures over the combination of such a density that a viewer of the opaque dark colored side can see through the panel but a viewer on the other side sees only the retroreflective light reflecting colors and image thereon. Preferably the diameter of each of the apertures is small enough so that the individual holes are not easily distinguishable by a viewer. The individual holes may be formed by a plurality of spaced apart dies or preferably by laser perforation which will remove the small plugs from the material without gumming up the dies normally caused by adhesives contained within the assembled sheet material.

Advantageously, the retroreflective light reflecting film may have a white color overlaid on a dark color. The white side of the retroreflective film is then coated with light reflecting particles such as glass beads, metallizing or other light reflecting particles held in place by a clear top coating. Additional translucent light permeable colors may then be overlaid over the retroreflective light reflecting white film. The translucent light permeable colors may be applied over the retroreflective sheet material before or after perforating. The sheet material may be vinyl containing retroreflective particles.

According to the present invention, a retroreflective vision control panel is provided having two discrete images observable from one side of the panel, i.e., the retroreflective side of the sheet material, depending upon the relative intensities of light incident on opposite sides of the panel. To accomplish this, sheet material having retroreflective material on one side and an opaque surface on the opposite side with translucent image-forming material, such as inks, overlying the retroreflective material and defining a first image are formed. An array of laser-formed perforations are provided through that sheet material, including the retroreflective and light-permeable materials. Additionally, and in accordance with the present invention, a non-perforated light-permeable material is provided on the side of the sheet material opposite the retroreflective material and lies at least in part in registration with the perforations through the sheet material. Light-permeable material, for example, translucent inks, are employed to form a second image on the non-perforated light-permeable material. In this manner, depending upon the relative intensities of light incident on opposite sides of the panel, an observer on one side of the panel (the perforated side) sees either one or the other of the first and second images on the panel.

As a representative example of the environment in which the control panel of the present invention may be used, the panel may be adhered to the inside of a display window of a store by using suitable clear adhesives with the retroreflective material preferably on the side of the sheet material facing the window. If the inside of the display window is dark or dimly lit, light incident on the outside of the window (the front side of the panel) and particularly on the translucent inks and retroreflective material, enables the first image formed on the retroreflective material to be seen from outside the display window, the image being one of very substantial intensity. Conversely, if the inside of the display window is brightly lit, and the outside of the display window is dark or only ambient non-intense light is applied, the light incident on the back side of the vision control panel enables the second image to be observed from outside the display window through the perforations of the sheet material. With very little or very dim light on the outside of the display window, the first image is not visible to an observer outside of the display window. The present vision control panel is particularly useful as a stand-alone panel having its own back light, for example, as confined in a light box wherein back light can be selectively applied. When turned off, light incident on the retroreflective or front side of the panel causes the first image to be observed from the front side of the panel. When the back light is turned on, to an intensity brighter than light incident on the retroreflective or front side of the panel, the backlit image dominates and is observed from the retroreflective side of the material.

Accordingly, it is a primary object of the present invention to provide a novel and improved vision control panel in which two images are selectively observable from one side of the panel dependent upon the intensity of light incident on opposite sides of the panels.

In a preferred embodiment according to the present invention, there is provided a retroreflective vision control panel for forming discrete images observable from one side of the panel, comprising sheet material having retroreflective material on one side of the sheet material and having an opaque surface on an opposite side thereof, light-permeable material comprising a translucent image-forming material overlying the retroreflective material and defining a first image on one side of the sheet material, an array of laser-formed perforations through the sheet material including through the retroreflective and light-permeable materials, the perforations forming 10–68% of open area through the sheet material and the retroreflective and light-permeable materials, such that an observer on one side of the sheet material sees the first image on the retroreflective material formed by the translucent material dependent on the relative intensity of light incident on opposite sides of the panel, a non-perforated light-permeable material on a side of the sheet material opposite the retroreflective material and at least in part in registration with the perforations through the sheet material, a light-permeable material comprising a translucent image-forming material on the non-perforated light-permeable material and defining a second image such that an observer on one side of the sheet material sees the second image through the perforations dependent on the relative intensity of the light incident on opposite sides of the panel, whereby the relative intensities of light incident on opposite sides of the panel determine the visibility of one or the other of the first and second images from one side of the panel.

In a further preferred embodiment according to the present invention, there is provided a method of forming a vision control panel for forming discrete images selectively observable from one side of the panel in accordance with the relative intensity of light incident on opposite sides of the panel, comprising the steps of laser-perforating a sheet material having a retroreflective surface on one side of the panel and an opaque surface on an opposite side of the sheet material to form an array of perforations through the sheet material, applying a light-permeable material in overlying relation to the retroreflective surface to define a first image on one side of the sheet material whereby the image on one side of the sheet material is observable from one panel side, applying a non-perforated light-permeable material on a side of the sheet material opposite the retroreflective material and forming a second image adjacent the opposite side of the sheet material and observable through the perforations through the sheet material from one panel side, thereby forming a vision control panel whereby the relative intensity of light incident on the opposite sides of the panel determines the visibility of one or the other of the first and second images from one panel side.

BRIEF DESCRIPTION OF THE DRAWINGS

FIG. 7 is a fragmentary view similar to FIG. 2 illustrating a control panel according to the present invention for forming discrete images; and FIG. 8 is a schematic illustration of a backlit control panel.

DETAILED DESCRIPTION WITH REFERENCE TO THE DRAWINGS

Figure 1:
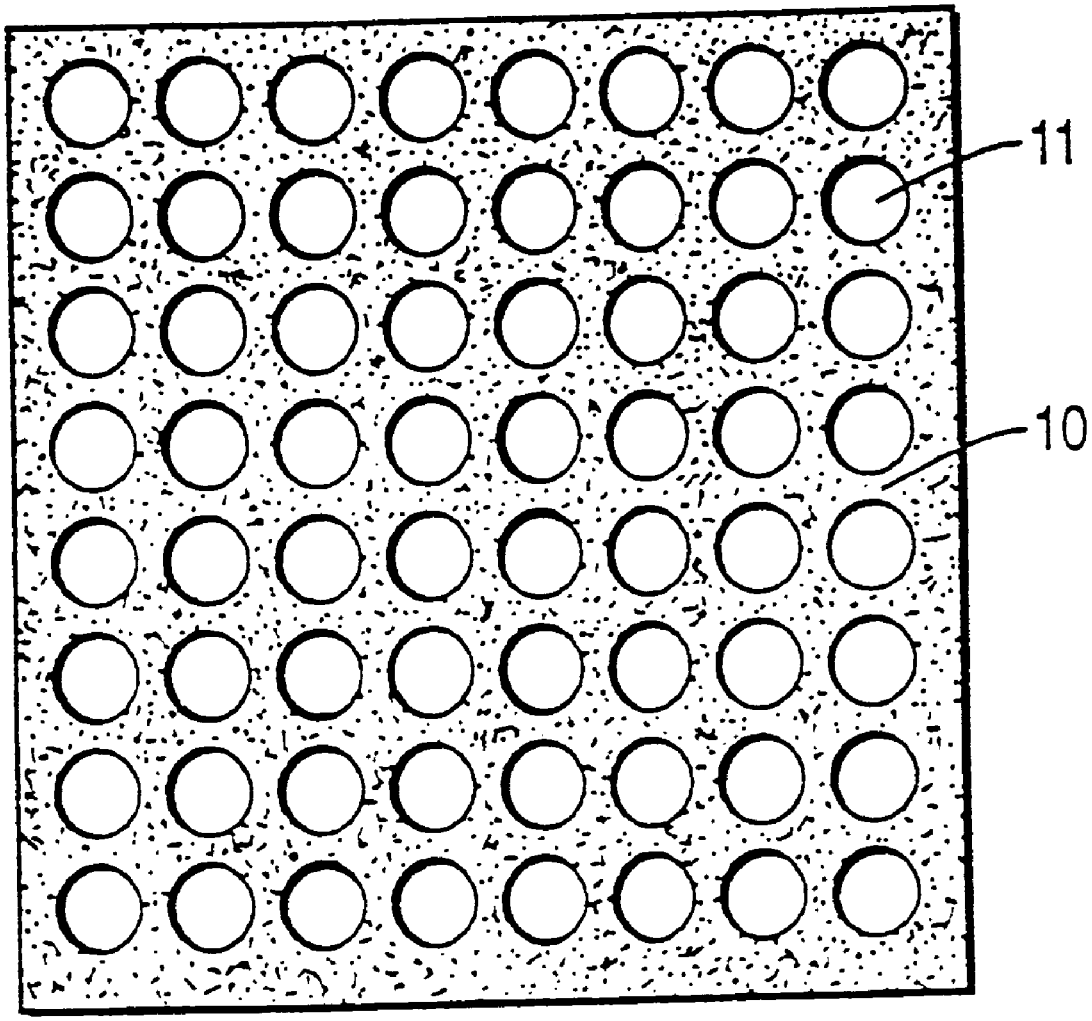
FIG. 1 is a plan view showing the pattern of perforations for the structure of FIG. 2.

In the drawings, like reference numbers refer to like parts. Referring to FIG. 1 there is shown a section of opaque retroreflective vinyl sheet 10 typically 2–8 millimeters thick and designed for application to window glass by adhesion or electrostatic attraction. Such special vinyl is commercially available from a number of sources. The diameter of each hole 11 may vary depending on the required density to match the viewing distance. A density of 64 holes per inch on a rectangular grid array is shown in FIG. 1 (not to scale). The holes may be made with conventional dies in a rectangular grid array but laser perforation is preferred because the retroreflective sheet materials are difficult to cut and because the glass beads cause excess tool wear or rapid dulling of the dies. Laser perforation and removal of the cut plugs does not cause the dies to be clogged or gummed up with the adhesive coatings within the vision control panel as in convention die perforation.

More specifically, with respect to hole size, shape and areas, the holes may be formed other than circular, such as square or triangular. Preferably, the holes are circular and, for vision control panels, have a hole diameter within a range of 0.03 inches to 0.25 inches (0.78 mm to 6.36 mm). With those ranges, about 10–68% of the panel comprises open areas defined by the holes. A typical vision control panel may therefore have a hole diameter of 0.05 inches (1.28 mm) with 114 holes per square inch providing an open area of 22%.

Figure 2:
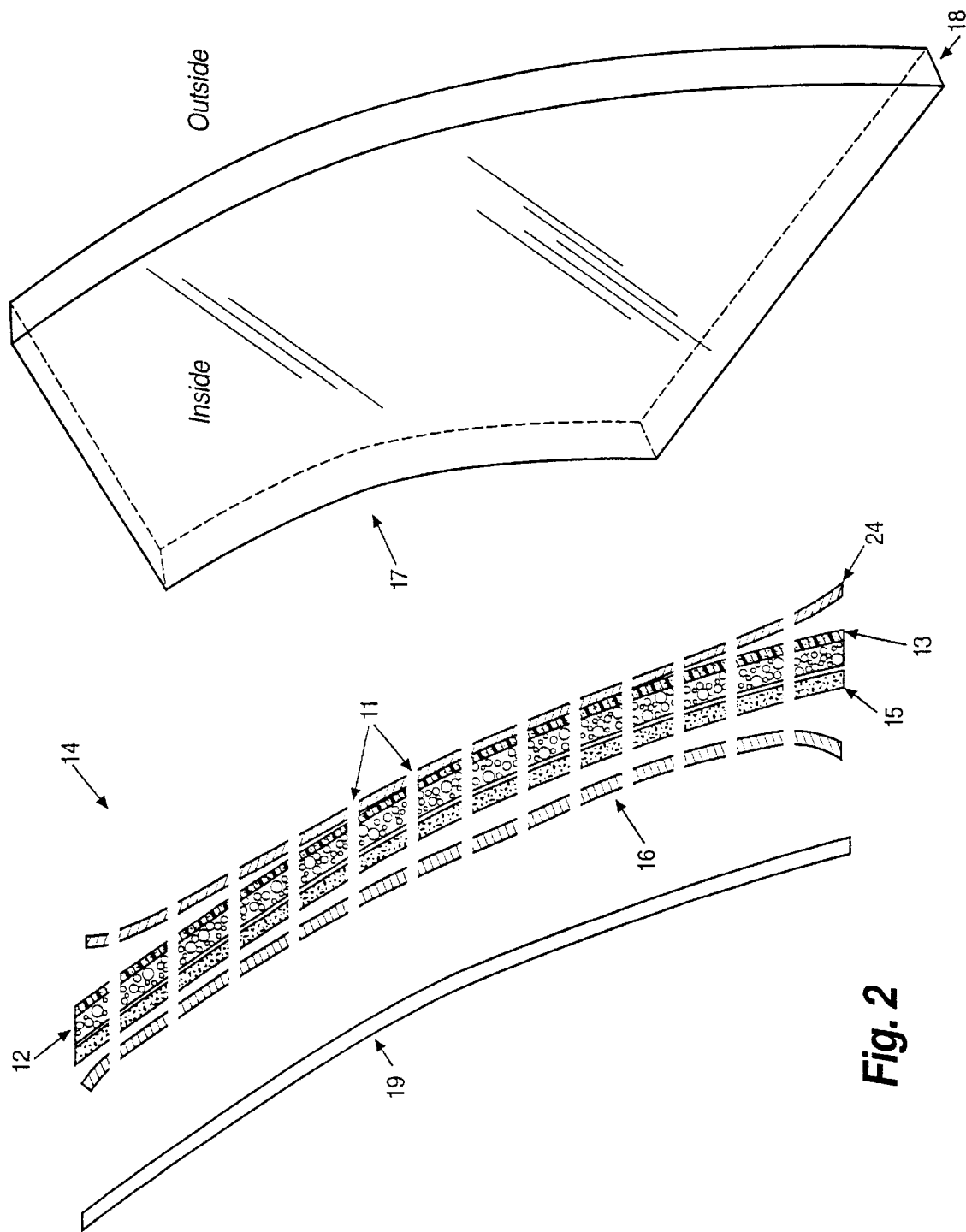
FIG. 2 is an elevated view of the structure of a retroreflective sheet material containing glass beads, metallizing or other retroreflective particles printed with light permeable translucent inks to allow reflected light to pass through the inks and the clear laminate containing no adhesive coating.

Referring to FIG. 2, there is shown a vision control panel 14 consisting of a retroreflective sheet material 12, e.g., opaque vinyl containing glass beads, metallizing or other retroreflective particles printed to form an image with light permeable translucent inks to allow reflected light to pass through the inks. The printing may be with electrostatic transfer method, silk screening, ink jet printing, painting, or other conventional methods of image development. A double sided clear transfer adhesive 13 is placed over the image surface of the sheet material after image printing but before perforation. A removable backer sheet 24 is attached to the transfer adhesive which may be removed just prior to application to the inside of window glass. On the opposite side of the sheet material 12 there is a dark colored adhesive 15 with a removable backer sheet 16 attached to the adhesive 15. The composite structure with image is then perforated with a laser in a manner in which the laser beam cuts out a circular pattern around the periphery of the plug (or any other closed curvilinear peripheral shape desired), and the plugs removed. The removable backer sheet 16 is removed and a clear laminate with U.V. chemical inhibitors, but without any adhesive coating, 19, is then laminated to the dark colored adhesive 15 to seal the structure from dirt and permit it to be cleaned without getting cleaning solutions like Windex™ or other agents in the holes thereby impairing visibility through the panel. The panel is then ready for installation against the inside of a window or like surface. Removable backer sheet 24 is removed and the panel is pressed against the inside surface 17 of a window 18.

Figure 3:
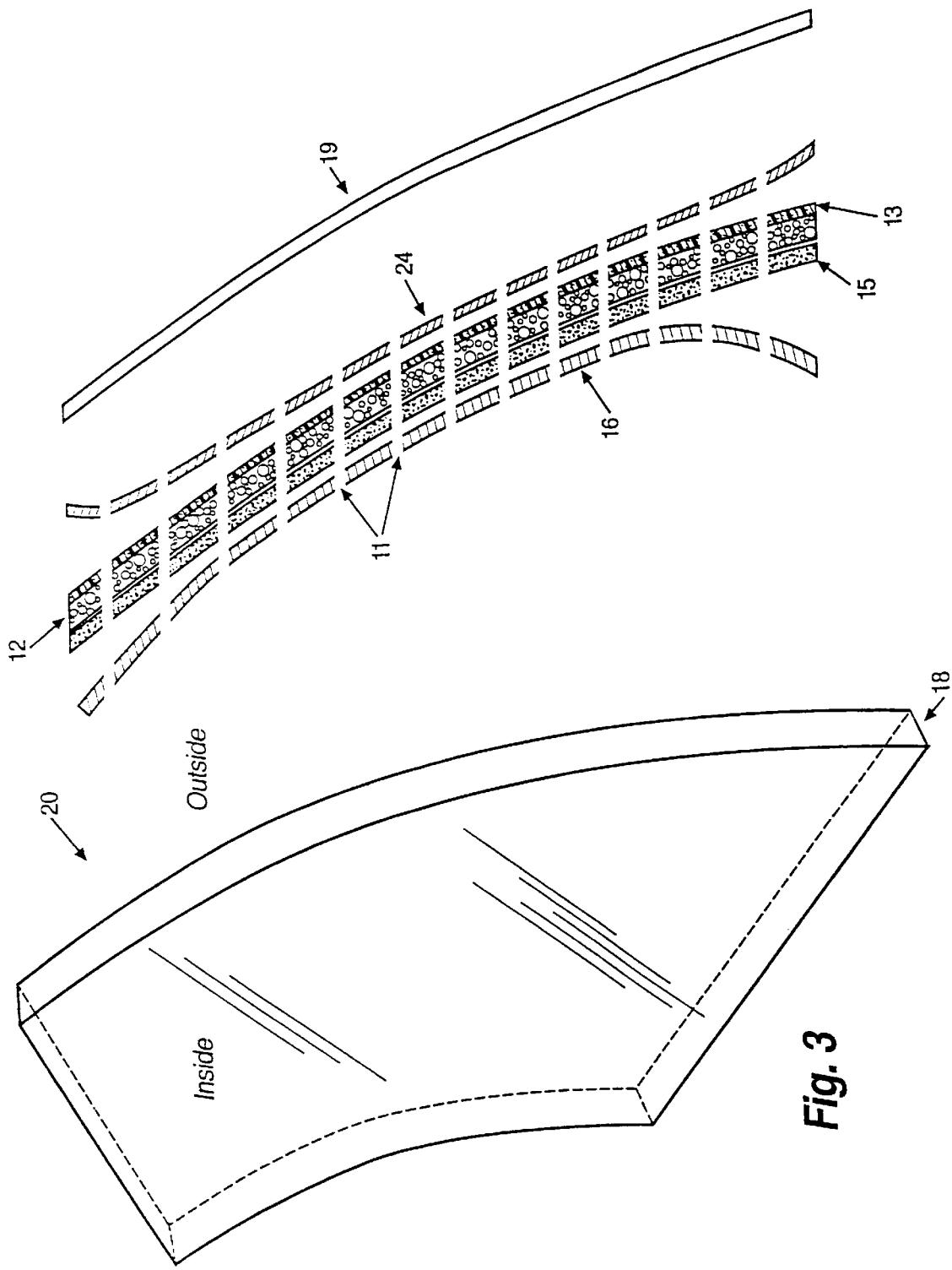
FIG. 3 is an elevation view of the structure of a retroreflective sheet material as in FIG. 2 except that the clear laminate is on the other side.

Referring to FIG. 3, there is shown a retroreflective sheet structure 12 designed to attach to the outside surface 20 of a window 18. In this case the only difference from that of FIG. 2 is that the clear laminate 19 is placed against the transfer adhesive 13 and the dark colored adhesive 15 is pressed against the glass normally on the outside surface 20 of window 18.

Figure 4:
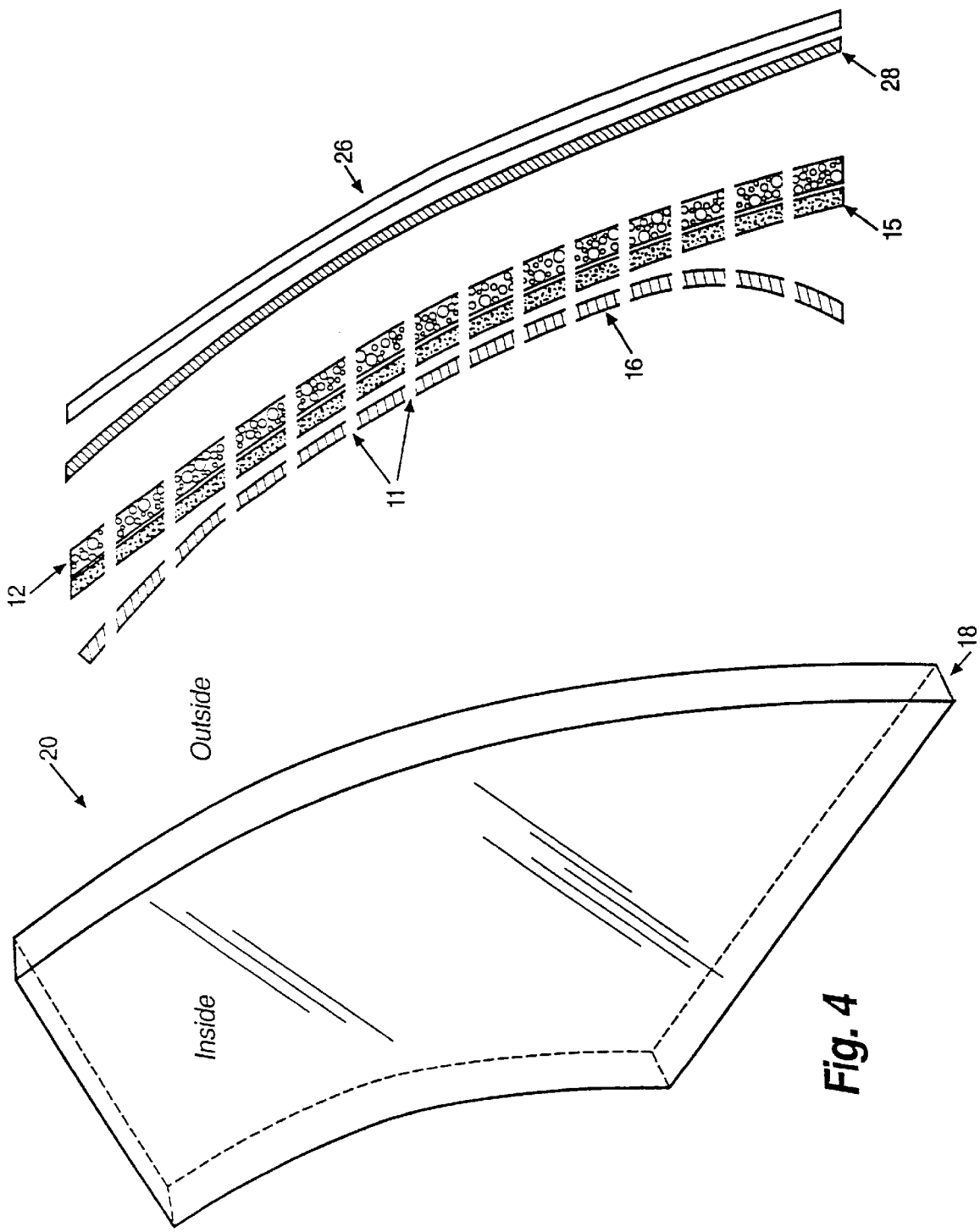
FIG. 4 is an elevation view of the structure of a retroreflective sheet material as in FIG. 3 except that the clear laminate does contain a clear adhesive coating thereon.

FIG. 4 shows a retroreflective sheet material 12 containing glass beads, metallizing or other retroreflective particles on an opaque sheet, e.g., vinyl, printed over the retroreflective material to form an image with light permeable translucent inks to allow reflected light to pass through the inks as in FIGS. 2 and 3 except that no transfer adhesive 13 is used. A clear laminate with clear adhesive coating 26 has a removable backer sheet 28 attached to the adhesive coating on clear laminate 26. The removable backer sheet 28 is removed from the clear laminate with clear adhesive coating 26 and pressed or laminated to the perforated image surface of sheet material 12. The clear adhesive avoids the glue from affecting vision through the perforations but may yellow over extended periods of time, unlike the clear laminate without adhesive 19 as shown in FIGS. 2 and 3. Translucent light permeable inks may be used to form the image prior to or after perforation but before applying the clear laminate 26.

Figure 5:
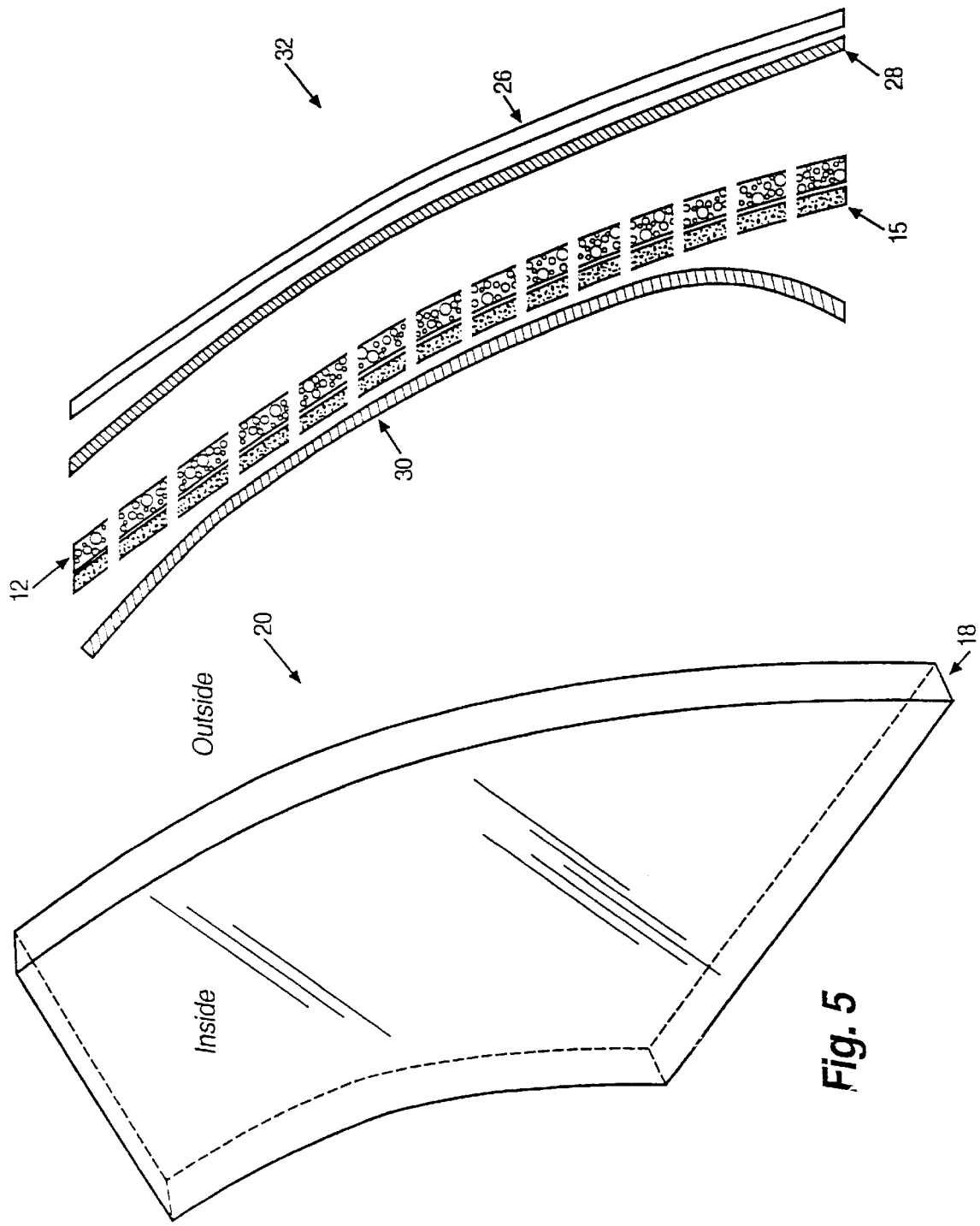
FIG. 5 is an elevation view of the structure of a retroreflective sheet material as in FIG. 4 except that the retroreflective sheet material is first pre-perforated prior to printing with light permeable translucent inks.
Figure 6:
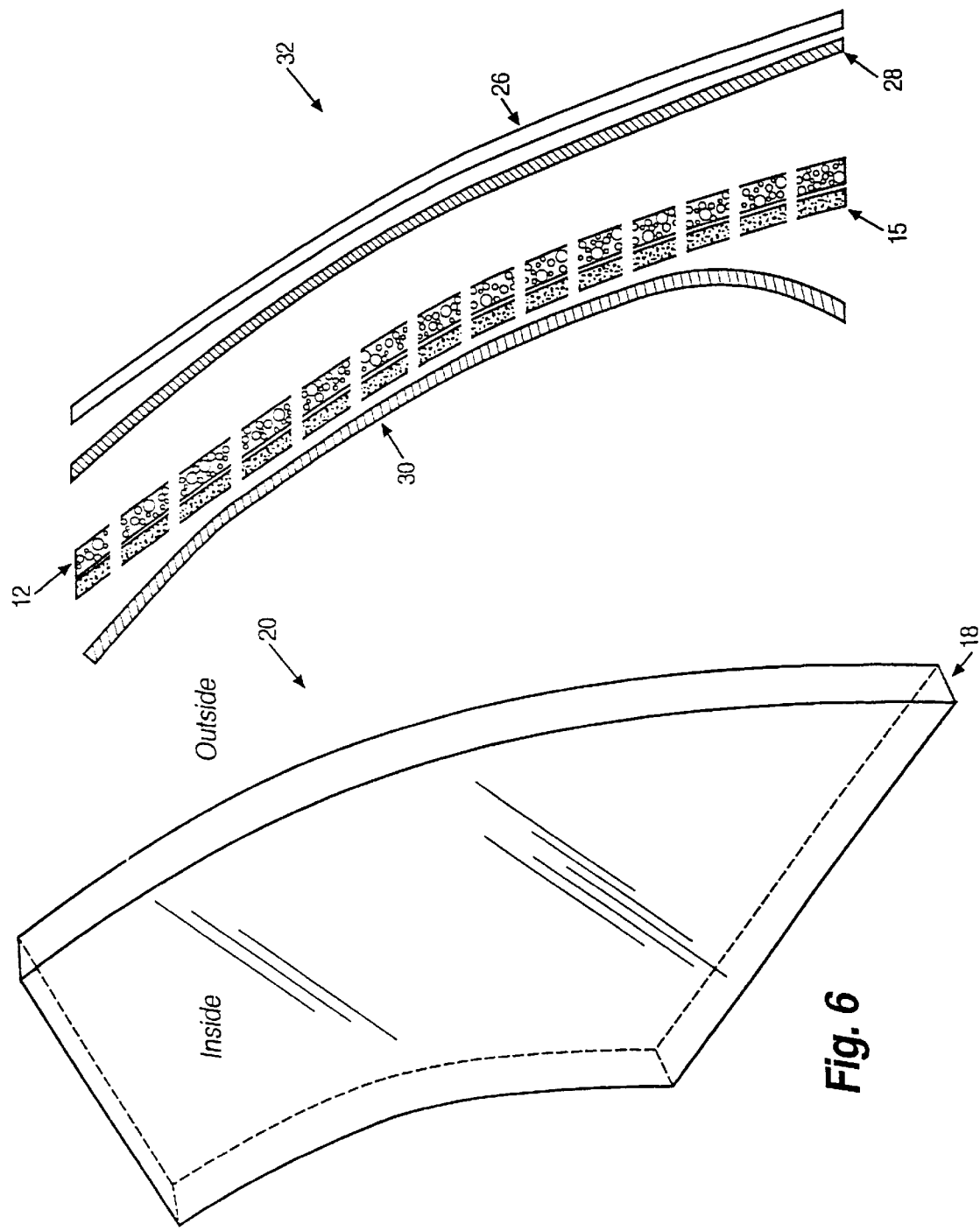
FIG. 6 is an elevation view of the structure of a retroreflective sheet material as in FIG. 5 except that a non-perforated removable backer sheet is used to carry away excess inks that may be overlaid in the perforated regions during the printing process.

Referring to FIG. 5, there is shown a structure identical to that of FIG. 4 except that a non-perforated removable backer sheet 30 is attached to the dark colored adhesive side 15 of a pre-perforated sheet material 12. The image is formed against the outside surface 32 of sheet material 12 after perforation of the latter. Any ink that gets into the perforations sticks to the removable non-perforated backer sheet 30 and is removed when the latter is removed.

The use of retroreflective sheet material made with glass beads or other light reflecting particles overlaid with light permeable translucent inks or films provides reflectivities of up to 100 times and more of conventional reflective surfaces. This means that in twilight or even darkness, any significant amount of light will allow a viewer to see the image on the panel, unlike conventional vision control panels which use colored dots. The foregoing describes a vision control panel in which the image of the retroreflective side is greatly intensified by ambient light incident thereon so that under relative dark conditions, the image can be seen from the front of the panel while an observer can see through the panel from its back side without seeing the image. In a further application thereof described below, the same sheet material together with additional materials are combined to provide a vision control panel wherein two discrete images are observable from the front side of the panel depending upon the intensity of light incident on opposite sides of the panel.

Referring to FIG. 7 wherein like reference numerals are applied to like parts as in the prior drawing figures, followed by the suffix "a," there is illustrated a multi-imaging panel 40 for forming discrete images observable from one side of the panel in accordance with the relative intensity of light incident on opposite sides of the panel. Particularly, the panel includes retroreflective sheet material 12a, e.g., opaque vinyl containing glass beads, metallizing or other retroreflective particles, printed to form a first image with light-permeable translucent inks to allow reflected light to pass through the inks. As previously noted, the printing may be electrostatic transfer method, silk screening, ink-jet printing, painting or other conventional methods. A double-sided clear transfer adhesive 13a may be placed over the image surface of the sheet material prior to perforation and a backer sheet 24a may similarly as previously described be attached to the transfer adhesive for applying the panel 40 to, for example, the inside of a display window. Perforations are formed by a laser in accordance with my prior U.S. Pat. No. 5,550,346 through the vinyl sheet containing the retroreflective material adhesive 15a and backer sheet 24a.

In order to provide a second image observable from the retroreflective side of the sheet material and different from the front image, a non-perforated, light-permeable material is provided on the back side of the opaque vinyl sheet containing the retroreflective material. Particularly, the light-permeable material may comprise a translucent substrate 46 or a transparent substrate which overlies the back side of the vinyl perforated retroreflective material. The translucent or transparent light-permeable material 46 is non-perforated and thus in part lies in registration with the perforations through the sheet material 12a. To provide a second image, the light-permeable material 46 is overlaid on either side of the sheet material 12a, the back side being illustrated, by translucent image-forming materials 48, such as inks, to form a second image which may be applied by any one of the previously identified methods for applying ink to the retroreflective material. Additionally, transparent adhesive 50 with a release paper 52 may be overlaid the back side of the light-permeable material in order that, upon removal of the transfer paper, the sheet may be applied to a transparent surface such as window glass. Alternatively, of course, the clear adhesive and the transfer paper may be omitted on the back side of the panel, with the front side of the panel having the transfer paper and adhesive for application of the panel to a display glass. Thus, it will be appreciated that the vision control panel for forming discrete images comprises from the front side to the back side translucent image-forming materials such as ink formed on retroreflective material such as glass beads, embedded or applied to an opaque substrate such as vinyl, with that combination being perforated preferably by laser perforations as indicated in my prior U.S. Pat. No. 5,550,346, with an additional transparent or translucent light-permeable material overlying the back side of the sheet material and containing translucent image-forming materials such as inks, preferably of different colors, the light-permeable translucent material on the back side being non-perforated.

It will be appreciated from the foregoing, that light incident on the retroreflective side of the sheet material of greater intensity than or comparable intensity to any light incident on the back side of the panel enables an observer on the front side of the panel to observe the first image without seeing the second image. Conversely, when the light incident on the back side of the panel is of an intensity greater than the intensity of the light incident on the front side of the panel, an observer on the front side of the panel will observe the second image and not observe the first image. It will be apparent that depending upon the relative intensities of the lights, one image will fade into the other image, which opens possibilities for special image effects, e.g., controlling, that is, by sharply or gradually varying the relative intensities of the light incident on at least one of the surfaces. To accomplish this, a light box 54 may be provided on the back side of the panel. The light box may consist of one or more lights 56, incandescent or fluorescent, and a switch 58 for turning the lights on or off. Additionally, the switch 58 may gradually increase or decrease the intensity of the light as desired. Thus, with a light box behind the control panel, the relative intensities of the light on opposite sides of the panel can be varied to change the image observable from the one side of the control panel. While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A light reflective vision control panel for forming discrete images observable from one side of the panel, comprising:

sheet material having light reflective material on one side of said sheet material and having an opaque surface on an opposite side thereof;

light-permeable material comprising a first translucent image-forming material overlying said light reflective material and defining a first image on said one side of said sheet material;

an array of perforations through the sheet material including through the light reflective and light-permeable materials, said perforations forming 10–68% of open area through said sheet material and said light reflective and light-permeable materials, such that an observer on said one side of said sheet material sees said first image on the light reflective material formed by said translucent material dependent on the relative intensity of light incident on opposite sides of the panel;

a non-perforated light-permeable material on a side of the sheet material opposite said light reflective material and at least in part in registration with the perforations through said sheet material;

a light-permeable material comprising a second translucent image-forming material on said non-perforated light-permeable material and defining a second image such that an observer on said one side of said sheet material sees said second image through said perforations dependent on the relative intensity of the light incident on opposite sides of the panel;

said second translucent image-forming material being applied on surface portions of said non-perforated light-permeable material both in and out of registration with the perforations through said sheet material such that a portion of said second image-forming material is blocked by non-perforated portions of said sheet material, leaving only portions of said second image-forming material forming said second image visible to the observer on said one side through said perforations;

whereby the relative intensities of light incident on opposite sides of the panel determine the visibility of one or the other of said first and second images from said one side of said panel.

2. A vision control panel according to claim 1 wherein said perforations are regularly spaced.

3. A vision control panel according to claim 1 including a non-perforated clear laminate sheet secured to and overlying the light reflective material of said sheet.

4. A vision control panel according to claim 1 wherein the diameter of said perforations is sufficiently small so that the perforations are indistinguishable by a viewer looking through said panel from at least several feet away.

5. A vision control panel according to claim 1 wherein said first and second image-forming materials each comprise a plurality of translucent inks forming said first and second images, respectively, said first translucent inks being applied to and overlying said light reflective material with the perforations extending through said first inks and to said non-perforated translucent sheet material.

6. A vision control panel according to claim 1 wherein said perforations are regularly spaced, the diameter of said perforations being sufficiently small so that the perforations are indistinguishable by a viewer looking through said panel from at least several feet away, said first and second image-forming materials each comprising a plurality of translucent inks forming said first and second images, respectively, said first translucent inks being applied to said light reflective material with the perforations extending through said first inks and to said non-perforated non-reflective translucent sheet material.

7. A vision control panel according to claim 1 including a non-perforated clear laminate sheet secured to and overlying said non-perforated light-permeable material.

8. A vision control panel according to claim 1 wherein said perforations are circular and have a hole diameter of approximately 0.05 inches.

9. A vision control panel according to claim 1 including a light source for illuminating the opposite side of said panel.

10. A vision control panel according to claim 1 wherein said second translucent image-forming material is applied between said non-perforated light-permeable material and said sheet material.

11. A vision control panel according to claim 1 wherein said second translucent image-forming material is applied to said non-perforated light-permeable material on a side thereof opposite said sheet material.

12. A method of forming a vision control panel for forming discrete images selectively observable from one side of the panel in accordance with the relative intensity of light incident on opposite sides of the panel, comprising the steps of:

perforating a sheet material having a light reflective surface on one side of the panel and an opaque surface on an opposite side of said sheet material to form an array of perforations through the sheet material;

applying a light-permeable material comprising first translucent image-forming material in overlying relation to said light reflective surface to define a first image on said one side of said sheet material whereby the image on said one side of said sheet material is observable from said one panel side;

applying a non-perforated light-permeable material on a side of the sheet material opposite said light permeable material; and forming a second image on one or another of opposite sides of the non-perforated light-permeable material adjacent said opposite side of said sheet material and observable through said perforations through said sheet material from said one panel side;

the step of forming including applying translucent second image-forming material on surface portions of said non-perforated light-permeable material to lie both in and out of registration with the perforations through said sheet material when said non-perforated light-permeable material is applied to said sheet material such that a portion of said second image-forming material is blocked by non-perforated portions of said sheet material, leaving only portions of said second image-forming material forming said second image visible to the observer on said one side through said perforations;

thereby forming a vision control panel whereby the relative intensity of light incident on the opposite sides of the panel determines the visibility of one or the other of said first and second images from said one panel side.

13. A method according to claim 12 including backlighting the opposite panel side to alter the intensity of the light incident on said opposite side panel.

14. A method of forming a vision control panel according to claim 12 including applying the panel to a transparent surface.

15. A method according to claim 12 wherein the step of applying said first and second light-permeable materials on said one side of said sheet material and on said non-perforated light-permeable material includes applying each of said first and second translucent inks in at least two colors thereof.

16. A method according to claim 12 including applying a clear, protective non-perforated sheet material with clear adhesive over said light reflective surface.

17. A method according to claim 12 including forming said perforations of a diameter sufficiently small so that the perforations are indistinguishable by an observer looking through said panel from at least several feet away.

18. A method according to claim 12 including perforating the sheet material so that the fraction of open area occupied by the perforations as compared with the total area over which the perforations are formed is in the range of 10–68%.

* * * * *